(12) United States Patent
Brenes et al.

(10) Patent No.: US 7,707,276 B2
(45) Date of Patent: Apr. 27, 2010

(54) REMOTE CONFIGURATION AND MANAGEMENT VIA ELECTRONIC MAIL

(75) Inventors: Manrique J. Brenes, Corona Del Mar, CA (US); Matthew B. McRae, Laguna Beach, CA (US); Kendra S. Harrington, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

(21) Appl. No.: 11/191,784

(22) Filed: Jul. 28, 2005

(65) Prior Publication Data

US 2007/0027965 A1    Feb. 1, 2007

(51) Int. Cl.
*G06F 15/16* (2006.01)
*G06F 15/177* (2006.01)

(52) U.S. Cl. .................. 709/220; 709/206; 709/221; 709/222

(58) Field of Classification Search ................ 709/206, 709/220, 223, 221, 222
See application file for complete search history.

(56) References Cited

U.S. PATENT DOCUMENTS

| | | | | |
|---|---|---|---|---|
| 6,012,088 A * | 1/2000 | Li et al. | ...... | 709/219 |
| 6,138,146 A * | 10/2000 | Moon et al. | ...... | 709/206 |
| 6,275,850 B1 * | 8/2001 | Beyda et al. | ...... | 709/206 |
| 6,799,148 B2 | 9/2004 | Ling et al. | | |
| 6,868,144 B2 | 3/2005 | Skladman et al. | | |
| 6,898,623 B1 * | 5/2005 | Williams et al. | ...... | 709/206 |
| 6,963,908 B1 * | 11/2005 | Lynch et al. | ...... | 709/220 |
| 7,146,412 B2 * | 12/2006 | Turnbull | ...... | 709/220 |
| 7,177,906 B2 * | 2/2007 | LeFevre et al. | ...... | 709/206 |
| 7,216,145 B2 * | 5/2007 | Collings, III | ...... | 709/206 |
| 7,231,434 B2 * | 6/2007 | Raghunandan | ...... | 709/220 |
| 7,283,272 B2 * | 10/2007 | Johnson et al. | ...... | 358/1.15 |
| 2003/0041127 A1 * | 2/2003 | Turnbull | ...... | 709/220 |
| 2003/0065738 A1 * | 4/2003 | Yang et al. | ...... | 709/215 |
| 2003/0074427 A1 * | 4/2003 | Haines et al. | ...... | 709/220 |
| 2003/0135618 A1 * | 7/2003 | Pisupati | ...... | 709/225 |
| 2003/0217124 A1 * | 11/2003 | Parry | ...... | 709/220 |
| 2004/0137919 A1 * | 7/2004 | Biundo | ...... | 455/466 |
| 2005/0193076 A1 * | 9/2005 | Flury et al. | ...... | 709/206 |
| 2005/0275873 A1 * | 12/2005 | Sekiguchi | ...... | 358/1.15 |
| 2006/0155810 A1 * | 7/2006 | Butcher | ...... | 709/206 |
| 2007/0027954 A1 * | 2/2007 | Chen et al. | ...... | 709/206 |

FOREIGN PATENT DOCUMENTS

JP    2004160687 A  *  6/2004

* cited by examiner

*Primary Examiner*—Alina N. Boutah
(74) *Attorney, Agent, or Firm*—Haynes and Boone, LLP

(57) ABSTRACT

A network device and a method of configuring a network device are provided. The method includes: receiving an e-mail message at the network device; parsing the e-mail message to retrieve configuration instructions; and executing a configuration action according to the configuration instructions contained in the e-mail message. The network device includes: a first upstream network interface; control logic configured to: receive an e-mail message; parse the e-mail message to retrieve configuration instructions; and execute a configuration action according to the configuration instructions contained in the e-mail message.

25 Claims, 3 Drawing Sheets

```
Date:     Sun, 01 Jan 2006 12:00:01 -0000 (GMT)
From:     network_administrator@serviceprovider.com
To:       router_12345@routermanufacturer.com
Subject:  ABCD1234

IP_ADDRESS=192.168.1.245
SUBNET_MASK=255.255.255.0
GATEWAY=192.168.1.1
AP_NAME="Home PC"
SSID="WSC"
CHANNEL=6
FIREWALL=ON
CONFIRMATION_REPLY_TO=network_administrator@serviceprovider.com
```

```
Date:      Sun, 01 Jan 2006 12:00:01 -0000 (GMT)
From:      network_administrator@serviceprovider.com
To:        router_12345@routermanufacturer.com
Subject:   ABCD1234

IP_ADDRESS=192.168.1.245
SUBNET_MASK=255.255.255.0
GATEWAY=192.168.1.1
AP_NAME="Home PC"
SSID="WSC"
CHANNEL=6
FIREWALL=ON
CONFIRMATION_REPLY_TO=network_administrator@serviceprovider.com
```

REMOTE CONFIGURATION AND MANAGEMENT VIA ELECTRONIC MAIL

BACKGROUND OF THE INVENTION

In many large network installations, remote management systems have been provided in order to enable network administrators to manage the network hardware and software. Although these remote management systems can provide network administrators with sophisticated tools for managing the network, the systems can also be quite expensive and complicated to deploy.

In conventional home networks and small office/home office (SOHO) networks, the network administrator is often a homeowner or small business owner with limited technical training. Therefore, home networking systems targeting the mass market generally attempt to provide simple and easy installation and configuration of the systems used to create the network, such as the modem, router, and firewall software. Accordingly, the conventional remote management systems may be too complex to operate smoothly with the home networking customer premises equipment (CPE). In addition, firewall or other protective software installed by the user may prevent any remote management of the CPE by users located outside the firewall.

It would be desirable to provide remote management of home network CPE, so as to enable service providers to update, configure, or troubleshoot the CPE. Because of the limited technical background of the home user, it would be desirable for the remote management system to be simple and not require burdensome local intervention. It would also be desirable to provide such a remote management system at low cost, in order to maintain mass market appeal.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In accordance with embodiments of the present invention, methods and systems are provided for the management of network devices using electronic mail (e-mail). The network device is provided with an e-mail client to receive configuration instructions via e-mail messages. The network devices can parse e-mail messages for instructions and execute a specific action based on the instructions received in the e-mail. In some embodiments, the network devices may be configured to authenticate and/or decrypt the e-mail messages prior to implementing the configuration instructions.

In accordance with other aspects of the present invention, a system may be provided with a user friendly management console to allow users to generate the configuration e-mail messages to be transmitted to the network devices.

Figure 1:
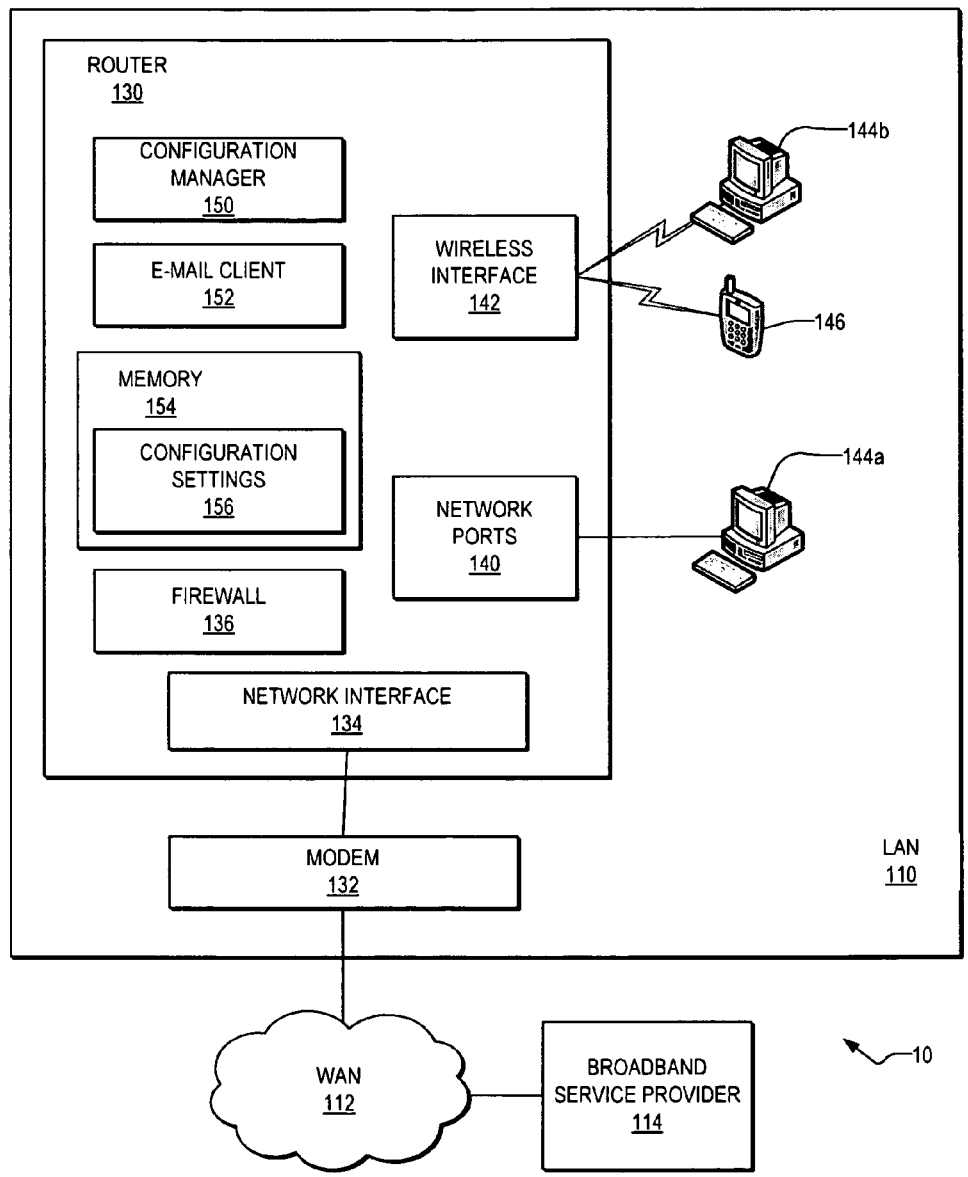
FIG. 1 is a block diagram showing a data communications network for remote management of a network device, in accordance with embodiments of the present invention.

FIG. 1 is a block diagram showing an exemplary data communications network 10, in accordance with embodiments of the present invention. In the illustrated embodiment, the data communications network 10 comprises a local area network (LAN) 110 connected to a wide-area network (WAN) 112, such as, e.g., the Internet. The LAN 110 includes a router 130 coupled to a modem 132 that provides an interface to the WAN 112. The router 130 and the modem 132 may be implemented as separate devices or as a single unit, such as a gateway network device. A network interface 134 comprising, e.g., an RJ-45 Ethernet port, is used to provide connectivity between the router 130 and the modem 132, and a firewall 136 may be provided in the router to prevent unauthorized access to the LAN 110.

The router 130 is also provided with one or more network interfaces for interfacing with other networked devices. In FIG. 1, the router 130 includes network ports 140 comprising, e.g., RJ-45 Ethernet ports, for coupling with one or more networked devices, such as personal computer (PC) 144a. In some embodiments, the router 130 may also include a wireless interface 142 to provide wireless network connectivity to the LAN 110 via a wireless local-area network (WLAN). The wireless interface 142 enables wireless-enabled computers and other devices (e.g., PC 144b and WiFi handset 146) to communicate with a wired network. The wireless router 130 may provide a wireless network compliant with the standards governed by, e.g., IEEE 802.11 ("WiFi"), IEEE 802.15.1 ("Bluetooth"), ultra wideband (UWB) radio, etc. In other embodiments, a wireless access point (WAP) for providing the wireless connectivity may be implemented as a separate device coupled to the router 130.

As described above, a firewall 136 may be provided (e.g., by the router 130) to prevent unauthorized access to the LAN 110. The firewall 136 can be implemented in either hardware or software, or a combination of both. Typically, a home user/network administrator will manage the router 130, the modem 132, and the firewall 136 manually using a network device (e.g., PC 144a) located within the LAN 110. The management functions can be performed by the network administrator using, e.g., a browser application directed to the router's IP address in order to view the router access web page, resident within the router firmware. Alternatively, the PC 144a may include a software management utility for configuring and managing the router 130.

In many cases, a service provider (SP), such as the broadband service provider 114, may wish to remotely manage customer premises equipment (CPE) located within the LAN 110. However, when a firewall is enabled, service providers located outside of the LAN 110 would be prevented from initiating management sessions with any service nodes located behind the firewall 136 within the LAN 110.

In accordance with embodiments of the present invention, a network device is provided with an e-mail client for receiving e-mail messages containing configuration instructions. The network device will retrieve the configuration instructions from the e-mail message and will execute the specific action contained in the configuration instructions. In the embodiment shown in FIG. 1, the router 130 includes a configuration manager 150, an e-mail client 152, and a memory 154 for storing configuration settings 156.

Figure 2:
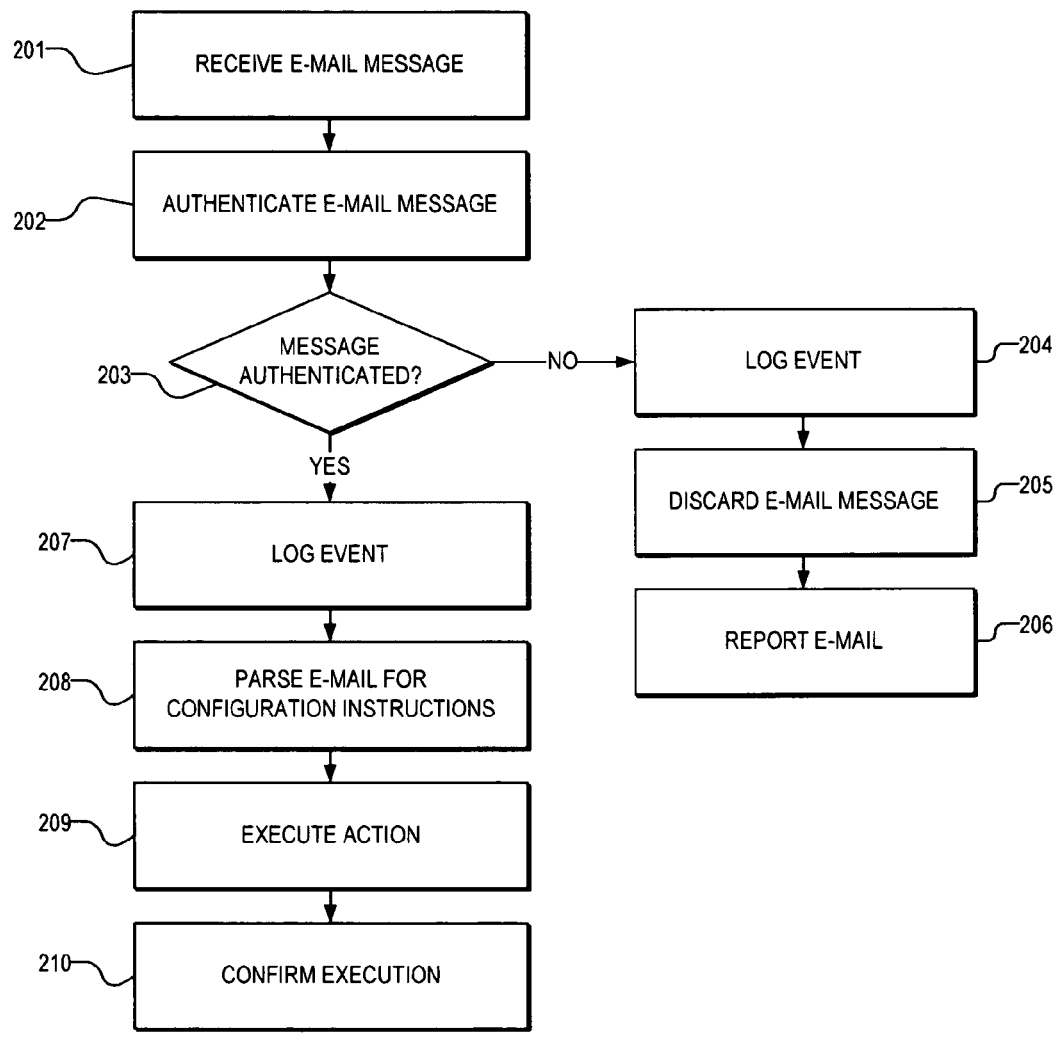
FIG. 2 is a flowchart illustrating a method of managing a network device, in accordance with embodiments of the present invention.

FIG. 2 is a flowchart illustrating a method of managing a network device, in accordance with embodiments of the present invention. In step 201, an e-mail message is received by the e-mail client 152. This e-mail message may be directed to a unique e-mail address assigned to the router 130. Thus, the message may originate from the WAN 112 (e.g., from the broadband SP 114), or from another device within the LAN 110, and still be successfully delivered to the e-mail client 152, despite the presence of the firewall 136 and without any knowledge of the existing configuration of the router 130. The firewall 136 can be configured to allow these types of e-mail messages to be received by the e-mail client 152 without significantly reducing the network protection provided by the firewall.

In step 202, the e-mail message is authenticated. This authentication may be performed in a variety of ways, with different levels of security. In one embodiment, the subject header for the e-mail message may include a password or identification code that is retrieved and authenticated by the configuration manager 150. In other embodiments, the e-mail message may also be encrypted by the sender, and later decrypted by the configuration manager 150 upon receipt by the e-mail client 152.

In step 203, if the message is not authenticated, then the process will proceed to step 204, in which the receipt of the unauthenticated message is recorded in an event log (e.g., stored in the memory 154). In step 205, the e-mail message may be discarded. In some embodiments, it may be desirable to report the receipt of the unauthenticated message in step 206. This reporting may be performed by transmitting an e-mail message from the e-mail client 152 to a previously-stored e-mail address of the network administrator. This reporting message may merely identify the receipt of an unauthenticated message, or may include a copy of the unauthenticated message. This can help the network administrator to determine whether the e-mail message was a mistake or malicious.

In step 207, if the message is properly authenticated, the event is recorded. In step 208, the e-mail is parsed for configuration instructions. These configuration instructions may be provided as an attachment to the e-mail message, or may be provided as text contained in the body of the e-mail message.

In step 209, the configuration manager 150 executes the action indicated by the configuration instructions in the e-mail message. In some embodiments, the configuration manager 150 may be configured to retrieve new configuration parameter settings from the text-based instructions contained in the body of the message. In other embodiments, a configuration file may be provided as an attachment to the e-mail message. The e-mail client 152 may be configured to retrieve Multipurpose Internet Mail Extensions (MIME) attachments from the configuration e-mail message. This would allow an e-mail message to be sent to the router 130 with a new firmware load as a simple e-mail attachment. The router 130 would then decode the MIME attachment, verify the firmware, and install the firmware update.

In some embodiments, the configuration manager 150 may be configured to provide a confirmation reply message in response to any configuration e-mails received. Thus, in step 210, the configuration manager 150 generates an e-mail confirming the execution of the configuration action contained in the configuration e-mail received in step 201. The e-mail client 152 may transmit this reply back to the sender of the configuration e-mail, or may transmit the reply to a different e-mail address, such as the predetermined e-mail address associated with the service provider or the network administrator. This would inform the sender that the commands were understood and that the router 130 was reconfigured properly. The reply e-mail would also serve as a time stamp for the corrective or configuration action.

Network devices in accordance with embodiments of the present invention may be implemented in a variety of ways. For example, the e-mail client 152 may utilize any of a variety of e-mail protocols, such as, e.g., Post Office Protocol (POP), Internet Message Access Protocol (IMAP), or may comprise a browser application configured to access a web-based e-mail account. In addition, the e-mail client 152 may be configurable to accommodate the intended deployment environment. For example, the e-mail client 152 may be configurable so that an administrator can set parameters, such as the identity of the mail server, the refresh interval for checking for new messages, user password, etc. These parameters may be configured manually by a user utilizing an management utility application or may be configured remotely using configuration e-mail messages, as described above.

Figure 3:
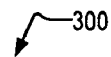
FIG. 3 shows an exemplary configuration e-mail message, in accordance with embodiments of the present invention.

The configuration e-mail messages received by the network device may be provided in a variety of formats. FIG. 3 shows an exemplary configuration e-mail message 300, in which the configuration instructions are provided using a text-based command-type syntax. In this example, the e-mail message 300 was transmitted by a network administrator at the broadband service provider 114 to the router having an identification number of 12345. The message 300 includes a subject line having a predetermined authentication code of "ABCD1234". The body of the message 300 includes a list of configuration parameter setting values. The message 300 may include configuration instructions regarding a variety of specific parameters, such as, e.g., DNS information, WiFi parameters, and default Gateways.

When this message 300 is received by the configuration manager 150, the configuration manager 150 will modify the configuration settings 156 stored in the memory 154 to match the values provided by the message 300. In other embodiments, the configuration e-mail messages may be provided in a different format. For example, the configuration instructions may be provided using an XML-based scheme.

Management Console

The configuration e-mail messages may be generated in a variety of ways. In some embodiments, a user may manually type the configuration instructions into an e-mail message using a standard e-mail editor, and transmit the e-mail message to the network device using a conventional e-mail client.

In accordance with embodiments of the present invention, a management console is provided for generating the configuration e-mail messages. This management console may provide a similar user interface and functionality as existing management consoles used to manage network devices, such as routers. However, rather than directly modifying the configuration settings in the network device, as is done by conventional consoles, this management console will generate a configuration e-mail message to be transmitted to the e-mail client for the network device. The configuration manager of the network device will then authenticate and parse the e-mail message to retrieve the configuration instructions, and will execute the desired actions.

In one embodiment, the management console may be provided, e.g., by the service provider 114 or the router manufacturer, to enable users to enter configuration setting values using a simple user-friendly interface. This interface may comprise a web-based application accessed using a browser connected to the Internet. Thus, the interface may be accessed by any type of device having Internet access, such as a PC, personal digital assistant (PDA), or mobile handset.

The management console may provide home users with assistance in determining the proper configuration settings for the target network device, and may detect existing network parameters in order to provide additional assistance. After the user has entered the desired configuration settings and/or actions using the browser interface, the web-based management service will generate a configuration e-mail containing the desired configuration instructions in the appropriate format. The service will then transmit the configuration e-mail to the e-mail address corresponding to the target network device to be configured. The web-based service enables users to generate the configuration e-mails without requiring that the user be familiar with the particular format for the configuration e-mail messages, nor that the user even have access to an e-mail client. Thus, this user interface may be utilized by anyone, including individuals outside of the LAN 110, such as administrators at the service provider 114 or at an equipment vendor, in order to manage network devices within the LAN 110.

The management service may provide a variety of functionality. For example, the management console may require that the user enter a password before being able to enter any configuration settings, in order to provide increased security for the user's network. In addition, the management console may allow the user to enable or disable the configuration e-mail functionality for the network device. If the e-mail functionality is disabled, the user will use conventional management methods in order to make configuration setting changes to the device.

EXAMPLE 1

Technical Support

These systems and methods may be utilized by a service support center for providing support to end users having networking equipment installed in their homes and businesses. For example, when a user contacts the support center for assistance with the user's networking equipment, the support center may request the e-mail address corresponding to the target device. The support center may then transmit an information request e-mail to the target device, requesting details regarding the configuration parameter settings for that device. The device may return a confirmation e-mail with the requested confirmation information included. The support center may then analyze this information in order to troubleshoot the user's support issues. The support center may send a subsequent configuration e-mail with the necessary changes.

In other embodiments, the network device may also be provided with a management console having a direct connection to the network device, similar to conventional management consoles used to configure routers or other networking equipment. The management console may be provided with a "Transmit Configuration to Tech Support" function. When the user selects this function, the management console will automatically generate a status e-mail message containing the all or a portion of the configuration parameters for that network device. This status e-mail message will then be transmitted to an e-mail address associated with the support center to initiate a support request. The technical support center can then reply to the e-mail message with a new set of configuration instructions to resolve the user's issue.

In some embodiments, the use of configuration e-mail messages may be used as a back-up, in the event that other management methods, such as HTTPS, SNMP, etc., are not available. In addition, this method can be used to back up and restore a device configuration, either by the user or by the support center.

EXAMPLE 2

Service Provider Management

Embodiments of the present invention can be used by service providers to manage networking equipment installed at users' home networks. The networking equipment can be preconfigured to automatically check an existing e-mail account upon installation at the user's location. In other embodiments, the equipment can be configured to check the e-mail account during an initial setup process.

A message will be transmitted to the e-mail account containing configuration instructions appropriate for that user's network. These configuration instructions will be executed as described above.

The service provider may also monitor the e-mail account for each network device to detect when the network device retrieves the configuration e-mail messages. This can provide the service provider with an accurate time of configuration completion.

EXAMPLE 3

Configuration of Multiple Devices

Embodiments of the present invention can be used by service providers to manage large numbers of networking equipment installed at users' home networks. When a service provider wishes to make a configuration change (e.g., a firmware update) to multiple network devices located in different LANs, the service provider can generate a single e-mail with the desired configuration instructions, and transmit the configuration e-mail to all of the network devices simultaneously. The use of e-mail can dramatically reduce the time required to deploy configuration changes to large numbers of network devices scattered across multiple networks.

The networking equipment can be preconfigured to automatically check an existing e-mail account upon installation at the user's location. In other embodiments, the equipment can be configured to check the e-mail account during an initial setup process.

EXAMPLE 4

Services Management

Embodiments of the present invention can be used to automatically configure the network device (e.g., a router) for optimal configuration settings when a specific service is in use. For example, when an application requiring high bandwidth is being used in the LAN 110, it may be desirable to implement temporary changes in order to accommodate or improve the performance of that application. One exemplary high bandwidth application is video streaming. If a user were to initiate a download of a video stream, the service provider may first generate and transmit a configuration e-mail message to the user's router 130 instructing the configuration manager 150 to modify the Quality of Service (QoS) settings before starting the data stream. QoS refers to the capability of a network to provide better service to selected network traffic by providing priority, including dedicated bandwidth, controlled jitter and latency, and improved loss characteristics.

Once the data stream is completed, it may be desirable for the service provider to generate a second configuration e-mail message to revert the router's configuration parameters back to their previous settings.

In another example, a service provider may transmit a configuration e-mail message to a user's router 130 after the user has requested a particular service. For instance, if the user signs up with the service provider to enable wireless access, VoIP access, or parental controls, the service provider can generate an e-mail message containing configuration instructions to configure the router 130 to enable those features.

EXAMPLE 5

DoS Prevention

In some embodiments, the router 130 may be configured to prevent Denial of Service (DoS) attacks on the e-mail client 152. This may be accomplished by configuring the router 130 to only allow a predetermined number of configuration e-mail messages within a predetermined period of time. For example, the configuration manager 150 may only retrieve one e-mail every 10 minutes. Thus, the configuration manager 150 would not be required to authenticate, unencrypt, and parse multiple e-mail messages, and then reconfigure itself each time, as would be the affect of a DoS attack using this method.

EXAMPLE 6

Multiple Access Levels

The network device may be configured to receive e-mail messages addressed to more than one e-mail address. This would allow the service provider or equipment vendor to assign multiple access levels and only allow certain configuration options for each of those access levels. Similarly, the network administrator or home user may provide multiple access levels for different users within the home, to allow some users minimal configuration capabilities and other users full administrative configuration capabilities.

Embodiments of the present invention may provide various advantages not provided by prior art systems. These embodiments can provide simple remote management of CPE, while leveraging existing network infrastructure.

While the invention has been described in terms of particular embodiments and illustrative figures, those of ordinary skill in the art will recognize that the invention is not limited to the embodiments or figures described. For example, in many of the embodiments described above, the network device receiving the configuration e-mail messages is a router. In other embodiments, the network device can be any equipment requiring management or configuration, such as, e.g., modems, gateways, set-top boxes, media adapters, network adapters, and peripherals.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A network device, comprising:
a first network interface; and
control logic configured to:
    receive an e-mail message;
    authenticate the e-mail message based on a password included in the e-mail message, wherein the password is contained in a subject header of the e-mail message;
    parse the e-mail message, if the e-mail message is properly authenticated, to retrieve configuration instructions that provide configuration settings within the e-mail message for the network device, wherein the e-mail message provides the configuration settings such that no additional configuration settings must be retrieved beyond the e-mail message; and
    execute a configuration action according to the configuration instructions and the configuration settings contained in the e-mail message to configure the network device.

2. The network device of claim 1, further comprising:
one or more interfaces; and
wherein the control logic comprises an e-mail client and a configuration manager.

3. The network device of claim 2, wherein:
the network device comprises a router; and
wherein the one or more interfaces comprises a wireless interface and a local area network interface.

4. The network device of claim 3, further comprising:
a memory for storing configuration settings;
wherein the control logic is configured to modify the configuration settings stored in the memory according to the configuration instructions contained in the e-mail message.

5. The network device of claim 1, wherein:
the control logic does not execute the configuration action if the e-mail message is not properly authenticated; and
the control logic is configured to perform the authentication of the e-mail message for only a predetermined number of e-mail messages within a predetermined period of time to prevent denial of service attacks.

6. The network device of claim 1, wherein:
the control logic is further configured to retrieve an attachment contained in the e-mail message.

7. The network device of claim 6, wherein:
the e-mail attachment comprises software or firmware; and
the control logic is further configured to install the software or firmware upon receipt of the e-mail message.

8. The network device of claim 1, wherein the control logic is configured to:
receive the e-mail message by accessing an e-mail account shared by a plurality of network devices.

9. The network device of claim 1, wherein the control logic is configured to:
generate an e-mail message confirming execution of the configuration action.

10. The network device of claim 1, wherein the control logic is configured to:
generate an e-mail message containing configuration information regarding the network device.

11. The network device of claim 10, wherein the control logic is further configured to:
receive an e-mail message containing a request for configuration parameter information;
identify the configuration parameter information requested by the e-mail message; and
generate a response e-mail message providing the requested configuration parameter information.

12. The network device of claim 1, wherein the control logic is configured to:
receive e-mail messages transmitted to a plurality of e-mail addresses, each e-mail address being associated with a unique set of allowable configuration actions.

13. A method of configuring a network device, comprising:
receiving an e-mail message at the network device, wherein the network device comprises a router;
authenticating the e-mail message based on a password included in the e-mail message;
parsing the e-mail message, if the e-mail message is properly authenticated, to retrieve configuration instructions, wherein the e-mail message with the configuration instructions includes configuration settings within the e-mail message for the network device such that no additional configuration settings must be retrieved beyond the e-mail message; and
executing a configuration action, if the e-mail message is properly authenticated, according to the configuration instructions contained in the e-mail message to configure the network device with the configuration settings,
wherein the network device comprises a router.

14. The method of claim 13, further comprising:
modifying configuration settings stored in a memory of the network device according to the configuration instructions contained in the e-mail message.

15. The method of claim 13, wherein the password is contained in a subject header of the e-mail message, and wherein the authenticating of the e-mail message is performed for only a predetermined number of e-mail messages within a predetermined period of time to prevent denial of service attacks.

16. The method of claim 13, further comprising:
retrieving an attachment contained in the e-mail message.

17. The method of claim 16, further comprising:
installing software or firmware contained in the e-mail attachment.

18. The method of claim 13, wherein:
said receiving the e-mail message comprises accessing an e-mail account shared by a plurality of network devices.

19. The method of claim 13, further comprising:
generating an e-mail message confirming execution of the configuration action.

20. The method of claim 13, further comprising:
generating an e-mail message containing configuration information regarding the network device.

21. The method of claim 20, further comprising:
receiving an e-mail message containing a request for configuration parameter information;
identifying the configuration parameter information requested by the e-mail message; and
generating a response e-mail message providing the requested configuration parameter information.

22. The method of claim 13, further comprising:
receiving e-mail messages transmitted to a plurality of e-mail addresses, each e-mail address being associated with a unique set of allowable configuration actions.

23. The method of claim 13, further comprising:
receiving configuration instructions entered into a management console;
generating the e-mail message containing the configuration instructions; and
transmitting the e-mail message to an e-mail address associated with the network device.

24. The method of claim 23, wherein:
said transmitting the e-mail message to the e-mail address associated with the network device comprises transmitting the e-mail message to a plurality of e-mail addresses associated with a plurality of network devices.

25. A network router, comprising:
means for connecting to a network;
means for receiving an e-mail message;
means for authenticating the e-mail message based on a password included in the e-mail message, wherein the authenticating means is configured to perform the authentication of the e-mail message for only a predetermined number of e-mail messages within a predetermined period of time;
means for parsing the e-mail message, if the e-mail message is properly authenticated by the authenticating means, to retrieve configuration instructions, wherein the e-mail message includes configuration settings within the e-mail message for the network router such that no additional configuration settings must be retrieved beyond the e-mail message; and
means for executing a configuration action, if the e-mail message is properly authenticated by the authenticating means, according to the configuration instructions contained in the e-mail message to configure the network router with the configuration settings.

* * * * *